United States Patent [19]

Marzola et al.

[11] 4,426,469

[45] Jan. 17, 1984

[54] GLASS FIBERS FOR THE REINFORCEMENT OF POLYOLEFINS AND REINFORCED POLYOLEFIN COMPOSITIONS OBTAINED THEREFROM

[75] Inventors: Roberto Marzola, Ferrara; Enea Garagnani, Piumazzo; Alessandro Moro, Pernate, all of Italy

[73] Assignee: Montedison S.p.A., Milan, Italy

[21] Appl. No.: 381,575

[22] Filed: May 24, 1982

Related U.S. Application Data

[63] Continuation of Ser. No. 235,848, Feb. 19, 1981, abandoned.

[30] Foreign Application Priority Data

Feb. 20, 1980 [IT] Italy ............................. 20034 A/80

[51] Int. Cl.$^3$ .............................................. C08K 3/40
[52] U.S. Cl. .................................. 523/209; 524/584; 524/586
[58] Field of Search ................ 523/205, 209; 428/378, 428/391, 392

[56] References Cited

U.S. PATENT DOCUMENTS

| | | | |
|---|---|---|---|
| 3,437,550 | 4/1969 | Paul | 528/251 |
| 3,472,729 | 10/1969 | Sterman et al. | 523/214 |
| 3,751,397 | 8/1973 | Muto | 523/213 |
| 3,855,175 | 12/1974 | Kakizaki | 523/213 |
| 3,882,068 | 5/1975 | Swartz | 524/582 |
| 3,936,415 | 2/1976 | Coakley | 523/206 |
| 4,278,586 | 7/1981 | Marzola et al. | 524/86 |

*Primary Examiner*—Lewis T. Jacobs

[57] ABSTRACT

Glass fibers for the production of reinforced polymers, characterized in that said fibers have a coating comprising, besides a film forming agent of polyolefinic kind and a silane, also a bis-maleamic acid such as N,N'-hexamethylene-bis-maleamic acid, N,N'-dodecamethylene-bis-maleamic acid or N,N'-isophoron-bis-maleamic acid.

The invention also concerns blends consisting of 50–90% by weight of a crystalline polyolefin, e.g. polypropylene and 50–10% by weight of said coated glass fibers.

7 Claims, No Drawings

GLASS FIBERS FOR THE REINFORCEMENT OF POLYOLEFINS AND REINFORCED POLYOLEFIN COMPOSITIONS OBTAINED THEREFROM

This is a continuation of application Ser. No. 235,848 filed Feb. 19, 1981, now abandoned.

BACKGROUND OF THE INVENTION

In Italian patent applications Nos. 27,243 A/78 and 24,668 A/79 and corresponding U.S. Pat. No. 4,278,586, there have been described composite materials consisting of:
(a) 50–90% by weight of a crystalline polyolefin, and
(b) 50–10% by weight of glass fibers, said materials being characterized in that they contain, as coupling agent, from 0.5% to 5% by weight, with respect to the polyolefin, of a bis-maleamic acid of general formula:

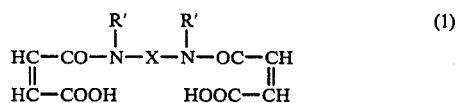

wherein X is a group $(CHR)_n$ in which n is an integer from 2 to 18 and R is hydrogen or an alkyl with 1–6 carbon atoms, or X is a bivalent cycloaliphatic or aromatic group also having several nuclei, or a heterocyclic group; R' is hydrogen, the two R's together being also capable of forming a group $(CHR)_n$ when X is $(CHR)_n$.

The preparation of such composite materials was achieved by heating the blend of polyolefin, bis-maleamic acid and glass fibers previously subjected to a finishing treatment with a silane and with a film-forming agent, preferably of polyolefinic kind having, in the molten state, a surface tension near that of the olefin polymer to be reinforced.

THE PRESENT INVENTION

An object of this invention is to provide glass fibers having a particular three-component coating, as well as blends comprising polymeric olefins and said glass fibers, which blends possess excellent mechanical characteristics and which are obtainable by a simple mixing process that does not require any previous treatment of the olefin polymer with ionizing radiations or with peroxides or other chemical agents for improving the adhesion of the polymer and reinforcing glass fibers.

These and other objects as will appear are achieved by this invention in accordance with which we have found that the composite materials of the prior art referred to above can be obtained by heating a blend of olefinic polymers and glass fibers the coating on which comprises, besides the silane and film-forming agent, the bis-maleamic acid as a coupling agent capable of promoting the adhesion of the coated glass fibers to the polymer during the processing of the blend.

Thus, the present invention concerns blends consisting of (a) 50%–90% by weight of a crystalling polyolefin, and (b) 50%–10% by weight of glass fibers having a coating comprising (1) a film-forming agent preferably consisting of an olefin polymer, (2) a silane and (3) a bis-maleamic acid having the general formula (1).

The manufactured articles obtained from such blends show mechanical properties comparable to those of the manufactured articles obtained from the three-component blends disclosed in the above-cited Italian patent applications, while their manufacture starting from the blends is considerably simplified.

The term "crystalline polyolefin" as used herein includes the crystalline copolymers of alpha-olefins with each other or with ethylene. In particular, there are included the products containing up to about 20% by weight of polymerized ethylene, obtained by polymerization of propylene in the presence of ethylene added either at the beginning or during the polymerization of propylene.

As examples of silanes present in the coating of the fibers there may be cited γ-aminopropyl-triethoxysilane, amino ethyl-triethoxysilane, γ-aminobutyl-triethoxysilane, and γ-glycidoxypropyl-trimethoxysilane.

As film-forming polyolefinic agents may be used, for instance, polypropylene, polyethylene, ethylene-propylene rubbers and ethylene-propylene-diene rubbers.

Such olefinic rubbers have a molecular weight of 50,000 to 800,000, preferably of 70,000 to 500,000 and contain from 20 to 80 mol % of ethylene and, if unsaturated, from 0.1 to 20 mol % of a conjugated or unconjugated diene hydrocarbon, such as butadiene, isoprene, 1,3-pentadiene, 1,4-pentadiene, 1,4-hexadiene, 1,5-hexadiene, 1,9-decadiene, alkenyl norbornenes, such as 5-methylene-2-norbornene and 5-vinyl-2-norbornene, norbornadienes, such as 2-alkyl-2,5-norbornadienes, alkylidene norbornenes, such as 5-ethylidene-2-norbornene, cyclopentadiene and others.

Representative and presently preferred bis-maleamic acids are:

N,N'-hexamethylene-bis-maleamic acid;
N,N'-ethylene-bis-maleamic acid;
N,N'-trimethylene-bis-maleamic acid;
N,N'-piperazin-bis-maleamic acid;
N,N'-dodecamethylene-bis-maleamic acid;
N,N'-m-phenylene-bis-maleamic acid;
N,N'-3,3'-(trans-stilbene-5,5'-sodiumsulphonate)-bis-maleamic acid;
N,N'-4,4'-(diphenyl-ether)-bis-maleamic acid;
N,N'-4,4'-(diphenylmethane)-bis-maleamic acid;
N,N'-isophoron-bis-maleamic acid (trivial name of the bis-maleamic acid deriving from 1-aminomethyl-5-amino-1,3,3-trimethylcyclohexane and having the formula:

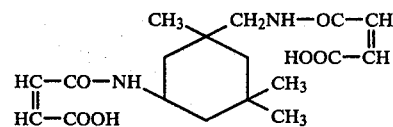

or a similar formula differing for the position of the nitrogen containing substituents);
N,N'-2,5-dimethylene-norbornane-bis-maleamic acid.

The coated glass fibers according to this invention are obtained by passing them, after their leaving the spinneret and according to known techniques, through an aqueous finishing bath containing from 0.5 to 10% of polyolefin, from 0.01 to 3% of silane and from 0.01 to 3% of bis-maleamic acid, besides other possible additives, said percentages being by weight.

The method of preparation of the composite materials of this invention consists in preparing a blend of polymer and glass fibers and in then heating the "dry blend" thus obtained at a temperature in general comprised between 200° C. and the decomposition temperature of the polymer, and coinciding in practice with the molding temperature of the polymer. In the case of polypropylene the molding temperature is comprised between 200° C. and 290° C.

In practice, the preparation of the composite material according to this invention, or of the related manufactured articles, is achieved by subjecting to molding, according to known techniques, the blends containing the polymer and the glass fibers or a granulate obtained from such blends by granulation according to known methods.

The blends of this invention allow to achieve an excellent polymer-to-fiber adhesion and, consequently, a breaking load considerably superior to that attainable without the use of bis-maleamic acid; this without the need of modifying previously the polymer or of resorting to the use of peroxides. In this way, besides avoiding a costly procedure of previous modification of the polymer, one also avoids all the drawbacks connected with the use of sources of free radicals, such as for instance cross-linking, degradation and poor resistance of the product to ageing.

As crystalline polypropylene, polybutene and poly-4-methylpentene-1 there are preferably used the polymers with a high percentage of macromolecules having the isotactic structure. In particular, there is used a polypropylene having an isotacticity index greater than 90%. There may also be used low or high density polyethylene.

In the examples that will follow, given only for illustrative and not limiting purposes, the glass fibers used had a coating obtained by passing the fibers as such through a finishing bath containing 0.6% of γ-aminopropyl-triethoxysilane, 6% of a terpolymer consisting of 67% ethylene, 30% propylene and 3% 5-ethylidene-2-norbornene, and 0.5% of N,N'-hexamethylene-, N,N'-dodecamethylene-, or N,N'-isophoron-bis-maleamic acid, said percentages being by weight.

EXAMPLES 1–4

1400 g of polypropylene powder having isotacticity index 95, density 0.90 g/cm$^3$ and melt index L=10 g/10 min. (ASTM D-1238 standards) were mixed for 5 minutes, in a powder mixer and under nitrogen atmosphere, with 600 g of glass fibers of the "chopped strands" type, 6 mm long, subjected to the above mentioned finishing treatment (in the following Table are indicated the bis-maleamic acids used), together with an antioxidizing formulation comprising 0.2% dilauryl thiodipropionate, 0.1% pentaerythritol tetra[3-(3,5-di-t-butyl-4-hydroxyphenyl)-propionate], 0.2% Ca stearate and 0.1% 2,6-di-t-butyl-p-cresol, the percentages by weight being referred to the polypropylene weight.

For comparative purposes, in the first of the 4 tests there were used fibers the coating on which did not contain a bis-maleamic acid.

From the 4 "dry blends" thus obtained test pieces were prepared for the physical-mechanical characterization by means of an injection molding press operating under the following conditions:

| | |
|---|---|
| temperature of the plasticizing chamber and injection head of the press | 250° C. |
| temperature of the mold | 25° C. |
| injection time for the test pieces for tensile tests | 20 sec. |
| time of full molding cycle for the test pieces for tensile tests | 70 sec. |
| injection time for the test pieces for bending, impact resistance and HDT tests | 80 sec. |
| total cycle for the test pieces for bending, impact resistance and HDT tests | 100 sec. |

The following Table reports, for the test pieces molded in the 4 tests, the values for the tensile breaking load (ASTM D-638 standards), flexural elastic modulus (ASTM D-790 standards), IZOD notched-bar resilience at −20° C. (ASTM D-256 standards), HDT (heat distortion temperature determined according to ASTM D-648 standards) and the creep under bending carried out on the central portion of the test piece for tensile tests (distance between supports 4 cm) at 80° C. and at 120° C., for 8 hours under a load of 100 Kg/cm$^2$.

EXAMPLES 5–6

1400 g of high density polyethylene powder, having density 0.962 g/cm$^3$ and melt index E=5.5 g/10 min. (ASTM D-1238 standards), were mixed for 5 minutes in a powder mixer and under nitrogen atmosphere with 600 g of glass fibers of the "chopped strands" type, 6 mm long, subjected to the above indicated finishing treatment (the Table records the bis-maleamic acid used), together with an antioxidizing formulation comprising, by weight, 0.03% n-octadecyl 3-(4-hydroxy-3,5-di-t-butylphenyl)propionate, 0.02% 2,6-di-t-butyl-p-cresol, 0.04% glyceryl monostearate and 0.1% Ca stearate, the percentages being referred to the weight of the polyethylene.

For comparative purposes, in Example 5 there were used fibers the coating of which did not contain bis-maleamic acid. From the two "dry blends" thus obtained there were prepared the test pieces for the physical-mechanical characterization by means of an injection molding press operating under the conditions described in Examples 1–4.

TABLE

| EXAMPLE NO. | | 1 | 2 | 3 | 4 | 5 | 6 |
|---|---|---|---|---|---|---|---|
| Polypropylene g | | 1,400 | 1,400 | 1,400 | 1,400 | — | — |
| High density polyethylene g | | — | — | — | — | 1,400 | 1,400 |
| Glass fibers without bis-maleamic acid (comparison) g | | 600 | — | — | — | 600 | — |
| Glass fibers with N,N'—hexamethylene-bis-maleamic acid g | | — | 600 | — | — | — | — |
| Glass fibers with N,N'—dodecamethylene-bis-maleamic acid g | | — | — | 600 | — | — | — |
| Glass fibers with N,N'—isophoron-bis-maleamic acid g | | — | — | — | 600 | — | 600 |
| Tensile breaking load | Kg/cm$^2$ | 403 | 900 | 900 | 950 | 400 | 920 |
| Flexural elastic modulus | Kg/cm$^2$ | 54,750 | 58,000 | 57,500 | 58,450 | 59,500 | 61,000 |
| IZOD resilience at −20° C. | Kgcm/cm | 8.6 | 14.7 | 13.8 | 15.2 | 25.3 | 28.2 |
| HDT | °C. | 133.3 | 150. | 147. | 151. | 121. | 127. |
| Deformation in mm resulting from | | | | | | | |

TABLE-continued

| EXAMPLE NO. | 1 | 2 | 3 | 4 | 5 | 6 |
|---|---|---|---|---|---|---|
| tests of creep under bending | | | | | | |
| at 80° C. | 1. | 0.41 | 0.43 | 0.40 | 1.82 | 0.61 |
| at 120° C. | — | 0.56 | 0.58 | 0.55 | — | — |

What is claimed is:

1. Glass fibers for the production of reinforced polymers, characterized in that said fibers have a coating comprising, besides a polyolefinic film-forming agent and a silane, also a bis-maleamic acid of general formula:

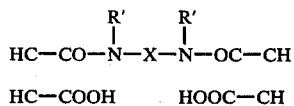

wherein X is a group $(CHR)_n$ in which n is an integer from 2 to 18 and R is hydrogen or an alkyl with 1–6 carbon atoms, or X is a bivalent cycloaliphatic or aromatic group also having several nuclei, or a heterocyclic group; R' is hydrogen, the two R's together being also capable of forming a group $(CHR)_n$ when X is $(CHR)_n$; said coating being obtained by passing the fibers, after their leaving the spinneret, through an aqueous finishing bath containing, by weight, from 0.5 to 10% of polyolefinic film-forming agent, from 0.01 to 3% of silane and from 0.01 to 3% of bis-maleamic acid.

2. Glass fibers according to claim 1, in which the polyolefinic film-forming agent is a terpolymer consisting of, 67% ethylene, 30% propylene and 3% 5-ethylidene-2-norbornene, the silane is γ-aminopropyl-triethoxy-silane and the bis-maleamic acid is selected from the group consisting of N,N'-hexamethylene-bis-maleamic acid, N,N'-dodecamethylene-bis-maleamic acid and N,N'-isophoron-bis-maleamic acid.

3. Blends consisting of (a) 50–90% by weight of a crystalline polyolefin and (b) 50–10% by weight of glass fibers according to claims 1 or 2.

4. Blends according to claim 3, in which the crystalline polyolefin is polypropylene.

5. Blends according to claim 3, in which the crystalline polyolefin is polyethylene.

6. Polyolefins reinforced with glass fibers, in the form of a granular product obtained by granulation of the blends according to claim 3.

7. Manufactured articles reinforced with glass fibers, obtained by subjecting to molding according to known methods blends according to claim 3.

* * * * *